(12) United States Patent
Stein et al.

(10) Patent No.: US 11,890,793 B2
(45) Date of Patent: Feb. 6, 2024

(54) ASSEMBLING FIBER-REINFORCED FOAMS

(71) Applicant: BASF SE, Ludwigshafen am Rhein (DE)

(72) Inventors: Robert Stein, Ludwigshafen am Rhein (DE); Holger Ruckdaeschel, Ludwigshafen am Rhein (DE); Rene Arbter, Ludwigshafen am Rhein (DE); Tim Diehlmann, Ludwigshafen am Rhein (DE); Gregor Daun, Ludwigshafen am Rhein (DE); Marc Claude Martin, Lemfoerde (DE)

(73) Assignee: BASF SE, Ludwigshafen am Rhein (DE)

(*) Notice: Subject to any disclaimer, the term of this patent is extended or adjusted under 35 U.S.C. 154(b) by 797 days.

(21) Appl. No.: 16/303,447

(22) PCT Filed: May 17, 2017

(86) PCT No.: PCT/EP2017/061888
§ 371 (c)(1),
(2) Date: Nov. 20, 2018

(87) PCT Pub. No.: WO2017/202671
PCT Pub. Date: Nov. 30, 2017

(65) Prior Publication Data
US 2020/0331179 A1    Oct. 22, 2020

(30) Foreign Application Priority Data

May 25, 2016 (EP) ..................... 16171416

(51) Int. Cl.
*B29C 44/50* (2006.01)
*B29C 44/54* (2006.01)
(Continued)

(52) U.S. Cl.
CPC .......... *B29C 44/5627* (2013.01); *B29C 44/50* (2013.01); *B29C 44/54* (2013.01);
(Continued)

(58) Field of Classification Search
None
See application file for complete search history.

(56) References Cited

U.S. PATENT DOCUMENTS 3,030,256 A    4/1962   Rosenthal
3,530,213 A  * 9/1970   Belle Isle ............... B29C 44/56
                                                      264/296
(Continued)

FOREIGN PATENT DOCUMENTS

DE         3811778 A1    11/1988
DE    102005060744 A1 *   7/2006   ............. B32B 3/266
(Continued)

OTHER PUBLICATIONS

DE-102005060744-A1 (Andersson) Jul. 2006 (online machine translation), [Retrieved on Oct. 14, 2021]. Retrieved from: Google (Year: 2006).*

(Continued)

*Primary Examiner* — Alison L Hindenlang
*Assistant Examiner* — Andrés E. Behrens, Jr.
(74) *Attorney, Agent, or Firm* — Faegre Drinker Biddle & Reath LLP

(57) ABSTRACT

The present invention relates to a method for assembling moulded bodies. The invention also relates to a moulded body which comprises a foam and at least one fibre (F), the fibre (F) is within a fibre range (FB2) inside the moulded body and is at least once at least partially divided, wherein at least one fibre (F) is completely divided. The invention further relates to the thus obtained assembled moulded body, and to a panel with contains the assembled moulded body (Continued)

Figure 1:
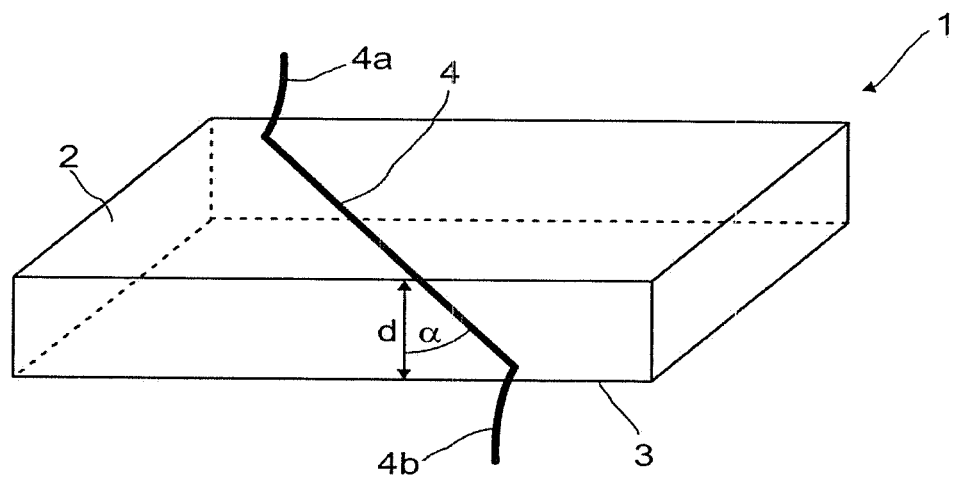

and at least one layer (S1). The invention further relates to a method for producing the panel and to the use of the assembled moulded body and the claimed panel, for example, as a rotor blade in wind turbines.

18 Claims, 3 Drawing Sheets

(51) Int. Cl.

| | | |
|---|---|---|
| B29C 70/08 | (2006.01) | |
| B29C 44/56 | (2006.01) | |
| F03D 1/06 | (2006.01) | |
| B29C 44/00 | (2006.01) | |
| B29K 105/04 | (2006.01) | |
| B29K 105/12 | (2006.01) | |
| B29L 31/08 | (2006.01) | |

(52) U.S. Cl.
CPC .......... *B29C 70/086* (2013.01); *F03D 1/0675* (2013.01); *B29K 2105/04* (2013.01); *B29K 2105/12* (2013.01); *B29L 2031/085* (2013.01)

(56) References Cited

U.S. PATENT DOCUMENTS

| | | | | |
|---|---|---|---|---|
| 3,881,972 | A | * | 5/1975 | Long ................ B29C 44/332 |
| | | | | 156/79 |
| 3,951,718 | A | | 4/1976 | Gonzalez |
| 4,196,251 | A | | 4/1980 | Windecker |
| 4,960,549 | A | * | 10/1990 | Brooks ................ B29C 44/60 |
| | | | | 264/148 |
| 5,624,622 | A | | 4/1997 | Boyce et al. |
| 6,187,411 | B1 | | 2/2001 | Palmer |
| 6,767,623 | B1 | | 7/2004 | Möck et al. |
| 7,201,625 | B2 | | 4/2007 | Yeh |
| 9,289,927 | B2 | | 3/2016 | Weber et al. |
| 2001/0031350 | A1 | | 10/2001 | Day et al. |
| 2005/0074593 | A1 | | 4/2005 | Day et al. |
| 2007/0112082 | A1 | | 5/2007 | Hahn et al. |
| 2009/0218724 | A1 | * | 9/2009 | Weber ............... B29C 65/3616 |
| | | | | 264/261 |
| 2009/0252917 | A1 | * | 10/2009 | Weber ................ B29C 70/086 |
| | | | | 428/102 |
| 2010/0189951 | A1 | * | 7/2010 | Weber ................ B29C 70/72 |
| | | | | 428/137 |
| 2010/0196652 | A1 | | 8/2010 | Romier et al. |
| 2010/0255251 | A1 | | 10/2010 | Le Roy |
| 2010/0266833 | A1 | | 10/2010 | Day et al. |
| 2012/0135180 | A1 | * | 5/2012 | Weber ................ B29C 70/887 |
| | | | | 428/71 |
| 2013/0108817 | A1 | * | 5/2013 | Bernhard .............. C08J 9/142 |
| | | | | 428/36.5 |
| 2017/0121452 | A1 | | 5/2017 | Kopczynski et al. |
| 2017/0151729 | A1 | * | 6/2017 | Joern ................ B29C 70/086 |
| 2017/0291390 | A1 | | 10/2017 | Daun et al. |
| 2017/0361545 | A1 | * | 12/2017 | Ruckdäschel ......... C08J 9/141 |
| 2017/0368761 | A1 | | 12/2017 | Neufeld et al. |
| 2017/0369667 | A1 | | 12/2017 | Ruckdaschel et al. |
| 2018/0009960 | A1 | | 1/2018 | Ruckdaschel et al. |
| 2018/0194897 | A1 | | 7/2018 | Desbois et al. |
| 2018/0257345 | A1 | | 9/2018 | Ruckdaschel et al. |

FOREIGN PATENT DOCUMENTS

| | | |
|---|---|---|
| DE | 102005024408 A1 | 11/2006 |
| EP | 0873862 A2 | 10/1998 |
| EP | 1883526 A1 | 2/2008 |
| EP | 2420531 A1 | 2/2012 |
| GB | 1375877 A | 11/1974 |
| GB | 2455044 A | 6/2009 |
| JP | H07229213 A | 8/1995 |
| WO | WO-2005056653 A1 | 6/2005 |
| WO | WO-2006079501 A1 | 8/2006 |
| WO | WO-2006125561 A1 | 11/2006 |
| WO | WO-2009047483 A1 | 4/2009 |
| WO | WO-2011012587 A1 | 2/2011 |
| WO | WO-2011040970 A1 | 4/2011 |
| WO | WO-2012134878 A2 | 10/2012 |
| WO | WO-2012138445 A1 | 10/2012 |
| WO | WO-2016041836 A1 | 3/2016 |
| WO | WO-2016102243 A1 | 6/2016 |
| WO | WO-2016102244 A1 | 6/2016 |
| WO | WO-2016102245 A1 | 6/2016 |
| WO | WO-2016102291 A1 | 6/2016 |
| WO | WO-2016102292 A1 | 6/2016 |
| WO | WO-20160102246 A1 | 6/2016 |
| WO | WO-2017005753 A1 | 1/2017 |
| WO | WO-2017016995 A1 | 2/2017 |
| WO | WO-2017045988 A1 | 3/2017 |
| WO | WO-2017076963 A1 | 5/2017 |
| WO | WO-2017202667 A1 | 11/2017 |
| WO | WO-2017202668 A1 | 11/2017 |
| WO | WO-2017202669 A1 | 11/2017 |
| WO | WO-2017202672 A1 | 11/2017 |

OTHER PUBLICATIONS

"Milling (Machining)." Wikipedia, Wikimedia Foundation, Apr. 17, 2016, https://web.archive.org/web/20160417162943/https://en.wikipedia.org/wiki/Milling_(machining). (Year: 2016).*
Written Opinion of the International Searching Authority for PCT/EP2017/061871 dated Aug. 4, 2017.
Written Opinion of the International Searching Authority for PCT/EP2017/061888 dated Aug. 23, 2017.
Written Opinion of the International Searching Authority for PCT/EP2017/061891 dated Jul. 13, 2017.
Notification of Transmittal of Translation of IPRP for PCT/EP2017/061888 dated Nov. 29, 2018.
International Search Report for PCT/EP2017/061868 dated Jul. 13, 2017.
International Search Report for PCT/EP2017/061869 dated Jul. 13, 2017.
International Search Report for PCT/EP2017/061871 dated Aug. 4, 2017.
International Search Report for PCT/EP2017/061888 dated Aug. 23, 2017.
International Search Report for PCT/EP2017/061891 dated Jul. 13, 2017.
Written Opinion of the International Searching Authority for PCT/EP2017/061868 dated Jul. 13, 2017.
Written Opinion of the International Searching Authority for PCT/EP2017/061869 dated Jul. 13, 2017.
Penczek et al. "Unsaturated Polyester Resins: Chemistry and Technology", Adv. Polym. Sci., vol. 184, pp. 1-95 (2005).
Williams, C., et al., "Resin Infusion under Flexible Tooling (RIFT) a review", Composites Part A, 1996, vol. 27, pp. 517-524.

* cited by examiner

ASSEMBLING FIBER-REINFORCED FOAMS

CROSS-REFERENCE TO RELATED APPLICATIONS

This application is a national stage application (under 35 U.S.C. § 371) of PCT/EP2017/061888, filed May 17, 2017, which claims benefit of European Application No. 16171416.7, filed May 25, 2016, both of which are incorporated herein by reference in their entirety.

The present invention relates to a process for converting moldings. Here, a molding comprising a foam and at least one fiber (F), wherein the fiber (F) is with a fiber region (FB2) located inside the molding and surrounded by foam, is at least partially divided at least once, wherein at least one fiber (F) is completely divided. The invention further relates to the thus obtainable converted molding and to a panel comprising the converted molding and at least one layer (S1). The present invention further relates to a process for producing the panel and to the use of the converted molding/the panel according to the invention as a rotor blade in wind turbines for example.

WO 2006/125561 relates to a process for producing a reinforced cellular material, wherein at least one hole extending from a first surface to a second surface of the cellular material is produced in the cellular material in a first process step. On the other side of the second surface of the cellular material, at least one fiber bundle is provided, said fiber bundle being drawn with a needle through the hole to the first side of the cellular material. However, before the needle takes hold of the fiber bundle, the needle is first pulled through the particular hole coming from the first side of the cellular material. In addition, the fiber bundle, on conclusion of the process according to WO 2006/125561, is arranged partially inside the cellular material, since it fills the corresponding hole, and the corresponding fiber bundle partially projects from the first and second surfaces of the cellular material on the respective sides.

By the process described in WO 2006/125561, it is possible to produce sandwich-like components comprising a core of said cellular material and at least one fiber bundle. Resin layers and fiber-reinforced resin layers may be applied to the surfaces of this core, in order to produce the actual sandwich-like component. Cellular materials used to form the core of the sandwich-like component may, for example, be polyvinyl chlorides or polyurethanes. Examples of useful fiber bundles include carbon fibers, nylon fibers, glass fibers or polyester fibers.

However, WO 2006/125561 does not disclose dividing the moldings after production thereof to completely divide the fiber bundles. The sandwich-like components according to WO 2006/125561 are suitable for use in aircraft construction.

WO 2011/012587 relates to a further process for producing a core with integrated bridging fibers for panels made from composite materials. The core is produced by pulling the bridging fibers provided on a surface of what is called a "cake" made from lightweight material partially or completely through said cake with the aid of a needle. The "cake" may be formed from polyurethane foams, polyester foams, polyethylene terephthalate foams, polyvinyl chloride foams or a phenolic foam, especially from a polyurethane foam. The fibers used may in principle be any kind of single or multiple threads and other yarns.

The cores thus produced may in turn be part of a panel made from composite materials, wherein the core is surrounded on one or two sides by a resin matrix and combinations of resin matrices with fibers in a sandwich-like configuration. However, WO 2011/012587 does not disclose dividing the cores after production thereof to completely divide the fibers.

WO 2012/138445 relates to a process for producing a composite core panel using a multitude of longitudinal strips of a cellular material having a low density. A double-ply fiber mat is introduced between the respective strips, and this brings about bonding of the respective strips, with use of resin, to form the composite core panels. The cellular material having a low density that forms the longitudinal strips, according to WO 2012/138445, is selected from balsa wood, elastic foams and fiber-reinforced composite foams. The fiber mats introduced in a double-ply arrangement between the individual strips may be a porous glass fiber mat for example. The resin used as adhesive may, for example, be a polyester, an epoxy resin or a phenolic resin, or a heat-activated thermoplastic, for example polypropylene or PET. However, WO 2012/138445 does not disclose that individual fibers or fiber bundles can be incorporated into the cellular material for reinforcement. According to WO 2012/138445, exclusively fiber mats that additionally constitute a bonding element in the context of an adhesive bonding of the individual strips by means of resin to obtain the core material are used for this purpose. Accordingly, WO 2012/138445 also does not disclose dividing where a fiber is located inside the molding and is completely divided.

GB-A 2 455 044 discloses a process for producing a multilayer composite article, wherein, in a first process step, a multitude of pellets made of thermoplastic material and a blowing agent are provided. The thermoplastic material is a mixture of polystyrene (PS) and polyphenylene oxide (PPO) comprising at least 20% to 70% by weight of PPO. In a second step the pellets are expanded, and in a third step they are welded in a mold to form a closed-cell foam of the thermoplastic material to give a molding, the closed-cell foam assuming the shape of the mold. In the next process step, a layer of fiber-reinforced material is applied to the surface of the closed-cell foam, the bonding of the respective surfaces being conducted using an epoxy resin. However, GB-A 2 455 044 does not disclose that a fiber material can be introduced into the core of the multilayer composite article. In addition, dividing of the closed-cell foam is not described.

An analogous process and an analogous multilayer composite article (to those in GB-A 2 455 044) is also disclosed in WO 2009/047483. These multilayer composite articles are suitable, for example, for use as rotor blades (in wind turbines) or as ships' hulls.

U.S. Pat. No. 7,201,625 discloses a process for producing foam products and the foam products per se, which can be used, for example, in the sports sector as a surfboard. The core of the foam product is formed by a particle foam, for example based on a polystyrene foam. This particle foam is produced in a special mold, with an outer plastic skin surrounding the molded foam. The outer plastic skin may, for example, be a polyethylene film. However, U.S. Pat. No. 7,201,625 also does not disclose that fibers for reinforcement of the material may be present in the particle foam or that the particle foam is divided.

U.S. Pat. No. 6,767,623 discloses sandwich panels having a core layer of polypropylene particle foam based on particles having a particle size in the range from 2 to 8 mm and a bulk density in the range from 10 to 100 g/l. In addition, the sandwich panels comprise two outer layers of fiber-reinforced polypropylene, with the individual outer layers being arranged around the core so as to form a sandwich.

Still further layers may optionally be present in the sandwich panels for decorative purposes. The outer layers may comprise glass fibers or other polymer fibers.

EP-A 2 420 531 discloses extruded foams based on a polymer such as polystyrene containing at least one mineral filler having a particle size of ≤10 μm and at least one nucleating agent. These extruded foams feature improved stiffness. Additionally described is a corresponding extrusion process for producing such extruded foams based on polystyrene. The extruded foams may be closed-cell foams. However, EP-A 2 480 531 does not state that the extruded foams comprise fibers and are divided.

WO 2005/056653 relates to particle foam moldings made of expandable, filler-comprising polymer granulates. The particle foam moldings are obtainable by welding prefoamed foam particles made of expandable, filler-comprising thermoplastic polymer granulates, the particle foam having a density in the range from 8 to 300 g/l. The thermoplastic polymer granulates are in particular a styrene polymer. The fillers used may be pulverulent inorganic substances, metal, chalk, aluminum hydroxide, calcium carbonate or alumina, or inorganic substances in the form of beads or fibers, such as glass beads, glass fibers or carbon fibers.

US 2001/0031350 describes sandwich materials comprising a fiber-reinforced, closed-cell material with a low density, reinforcing fiber layers and a resin. The closed-cell material having a low density is a foam. The core material of the sandwich materials comprises segments of the foam that are bonded to one another by fiber layers. In addition, fibers, for example in the form of rovings, may be introduced into the segments for reinforcement, and may penetrate the fiber layers. The fiber is present with a region within the core material, and a second fiber region projects from the first side of the foam and a third fiber region from the second side. In order to introduce the fiber into the foam, US 2001/0031350 uses needles. The needles produce a hole from the first side of the foam to the second side, while simultaneously bringing the fiber from the first side of the foam to the second side of the foam, such that the fiber is partly within the foam and partly outside the foam. The segments may be sawn before joining.

Similar sandwich materials are described in US 2005/0074593. These sandwich materials likewise comprise a fiber-reinforced closed-cell material comprising reinforcing fiber layers and a resin. These sandwich materials optionally comprise additional fibers in the form of rovings that have been introduced into the sandwich materials. US 2005/0074593 also describes that the sandwich materials may be joined and prior to joining may optionally be sawn.

WO 2011/040970 describes composite sandwich panels comprising a low-density core material and a strong outer skin. The sandwich materials typically comprise a plurality of strips or blocks of the low-density core material held together by the strong outer skin which is for example made of non-crimp fabrics or wovens of glass fiber rovings.

The core materials are sawn to produce the strips. Moreover, the individual strips may also comprise rovings for reinforcement.

The disadvantage of the processes described in US 2011/0031350, US 2005/0074593 and WO 2011/040970 is that rovings that may be present in the foams are often torn out during sawing so that the fiber reinforcement of the core materials is at least partially lost.

GB 1,375,877 describes a composite material constructed from layers of glass fibers which have been introduced between strong foam layers. These composite materials may be cut with a knife or a saw. Moldings where at least one fiber has been introduced into a foam are not described in GB 1,375,877. The disadvantage of using exclusively layers of glass fibers is that three-dimensional reinforcing is possible only when the produced composite materials are cut and rejoined to one another via glass fiber mats.

The present invention accordingly has for its object the provision of a novel process for converting moldings.

The object is achieved by a process for converting a molding comprising the following steps a) and b):
  a) providing a molding comprising a foam and at least one fiber (F), wherein the fiber (F) is with a fiber region (FB2) located inside the molding and surrounded by the foam,
  b) at least partially dividing the molding at least once, wherein at least one fiber (F) is completely divided to obtain a converted molding, wherein
  in step a) the molding is provided when at least one fiber (F) is partially introduced into the foam with the result that the fiber (F) is with the fiber region (FB2) located inside the molding and surrounded by the foam while a fiber region (FB1) of the fiber (F) projects from a first side of the molding and a fiber region (FB3) of the fiber (F) projects from a second side of the molding and the fiber region (FB1) and/or the fiber region (FB3) are then optionally removed, wherein
  partial introduction is preferably effected by steps a1) to a6):
  a1) optionally applying at least one layer (S2) and optionally applying at least one carrier layer (TS) to at least one side of the foam,
  a2) producing one hole per fiber (F) in the foam and optionally in the layer (S2) and optionally in the carrier layer (TS), wherein the hole extends from a first side to a second side of the foam and optionally through the layer (S2) and optionally through the carrier layer (TS),
  a3) providing at least one fiber (F) on the second side of the foam,
  a4) passing a needle from the first side of the foam through the hole to the second side of the foam and optionally passing the needle through the layer (S2) and optionally passing the needle through the carrier layer (TS),
  a5) securing at least one fiber (F) to the needle on the second side of the foam and
  a6) returning the needle along with the fiber (F) through the hole, so that the fiber (F) is with the fiber region (FB2) located inside the molding and surrounded by the foam while the fiber region (FB1) of the fiber (F) projects from a first side of the molding or optionally from the layer (S2) or optionally from the carrier layer (TS) and the fiber region (FB3) of the fiber (F) projects from a second side of the molding.

The present invention therefore also provides a process for converting a molding, comprising the following steps a) and b):
  a) providing a molding comprising a foam and at least one fiber (F), wherein the fiber (F) is with a fiber region (FB2) located inside the molding and surrounded by the foam,
  b) at least partially dividing the molding at least once, wherein at least one fiber (F) is completely divided to obtain a converted molding.

The processes according to the invention advantageously enable in particular the introduction of slots and grooves into the molding while the processes according to the invention may moreover also be used to perform shaping cuts to alter the outer contours of the molding as well as scarfings to generate for example thickness transitions and extending structures in the molding. Surprisingly, the processes according to the invention do not result in pullout of the fiber (F) during the at least partial dividing of the molding.

The introduction of slots in particular achieves a good drapability of the converted molding. Furthermore, the processes according to the invention result in virtually no material removal at the molding and so only little if any fiber (F) and/or foam scrap is formed. This is advantageous in particular since this scrap is difficult to recycle and also questionable in terms of health and safety, in particular in terms of the health of workers.

The processes according to the invention also afford very good, clean and precise cuts and thus also cut edges for which a very low width may be achieved. The targeted production of open and closed cut surfaces is also possible. The mechanical properties of the obtained converted moldings are virtually as good or even as good as the mechanical properties of the molding provided in step a) and remain virtually unchanged by the at least partial dividing.

The moldings produced in accordance with the invention also advantageously feature a low resin absorption coupled with good interfacial bonding. This effect is important especially when the converted molding produced according to the invention is being further processed into the panels according to the invention. Resin absorption may be influenced in particular by targeted production of open or closed cut surfaces and by cuts having a low thickness.

A further improvement in bonding coupled with reduced resin absorption may be achieved in the converted molding/ in the panels resulting therefrom when in a preferred embodiment the molding provided in step a) has a fiber region (FB1) of the fiber (F) that projects from a first side of the molding. This fiber region (FB1) of the fiber (F) is preferably retained in the converted molding. The fibers/ fiber bundles are then advantageously laid down on the foam surface not flushly but with an overhang and thus enable an improvement in bonding/a direct joining with the corresponding outer plies in the panel according to the invention. This is the case in particular when as an outer ply according to the invention at least one further layer (S1) is applied to the converted moldings according to the invention to form a panel. It is preferable when two layers (S1) which may be identical or different are applied. In this case it is particularly advantageous when in addition to the fiber region (R31) of the fiber (F) a fiber region (FB3) of the fiber (F) projects from a second side of the molding. This fiber region (FB3) is then preferably also retained in the converted molding. It is then particularly preferable when two identical layers (S1), in particular two identical fiber-reinforced resin layers, are applied to opposite sides (the first side and the second side) of the converted molding according to the the invention to form a panel according to the invention. Such panels are also referred to as "sandwich materials" and the molding according to the invention may also be referred to as "core material".

The panels of the invention are thus notable for low resin absorption in conjunction with good peel strength. Moreover, high strength and stiffness properties can be specifically adjusted through the choice of fiber types and the proportion and arrangement thereof. The effect of low resin absorption is important because a common aim in the use of such panels (sandwich materials) is that the structural properties are to be increased while attaining the lowest possible weight. When using fiber-reinforced outer plies for example the resin absorption of the core material contributes to the total weight in addition to the actual outer plies and the sandwich core. However, the converted moldings according to the invention/the panels according to the invention can reduce resin absorption, thus allowing weight and cost savings.

Further improvements/advantages can be achieved when the fibers in the molding in step a) have been introduced into the foam at an angle α in the range from 0° to 60° in relation to the thickness direction (d) of the foam, particularly preferably from 0° to 45°. Introduction of the fibers at an angle α of 0° to <90° is generally technically feasible. The angle α of the fiber (F) is retained even during the at least partial dividing of the molding to obtain the converted molding in step b).

Additional improvements/advantages can be achieved when the fibers are not only introduced into the foam parallel to one another but further fibers are also introduced at an angle β to one another which is preferably in the range from >0° to 180°. This additionally achieves an improvement in the mechanical properties of the obtained converted molding.

It is likewise advantageous when in the panels according to the invention the resin (outer) layer is applied by liquid injection methods or liquid infusion methods in which the fibers can be impregnated with resin during processing and the mechanical properties improved. This can additionally result in cost savings.

The present invention is further specified hereinbelow.

According to the invention step a) comprises providing a molding which comprises a foam and at least one fiber (F).

The foam may be based on any polymers known to those skilled in the art.

The foam is for example based on at least one polymer selected from polystyrene, polyester, polyphenylene oxide, a copolymer prepared from phenylene oxide, a copolymer prepared from styrene, polyaryl ether sulfone, polyphenylene sulfide, polyaryl ether ketone, polypropylene, polyethylene, polyamide, polyamide imide, polyether imide, polycarbonate, polyacrylate, polylactic acid, polyvinyl chloride, polyurethane or a mixture thereof.

It is preferable when the foam is based on at least one polymer selected from polystyrene, polyphenylene oxide, a mixture of polystyrene and polyphenylene oxide, polyethylene terephthalate, polycarbonate, polyether sulfone, polysulfone, polyether imide, a copolymer prepared from styrene, or a mixture of copolymers prepared from styrene. It is particularly preferable when the polymer is polystyrene, a mixture of polystyrene and poly(2,6-dimethylphenylene oxide), a mixture of a styrene-maleic anhydride polymer and a styrene-acrylonitrile polymer, or a styrene-maleic anhydride polymer (SMA).

Polyphenylene oxide is preferably poly(2,6-dimethylphenylene ether), which is also referred to as poly(2,6-dimethylphenylene oxide).

Suitable copolymers prepared from phenylene oxide are known to those skilled in the art. Suitable comonomers for phenylene oxide are likewise known to those skilled in the art.

A copolymer produced from styrene preferably comprises as a comonomer for styrene a monomer selected from α-methylstyrene, ring-halogenated styrenes, ring-alkylated styrenes, acrylonitrile, acrylic esters, methacrylic esters, N-vinyl compounds, maleic anhydride, butadiene, divinylbenzene and butanediol diacrylate.

The foam has for example been produced from a particle foam, an extruded foam, a reactive foam and/or a batch foam. The foam has preferably been produced from an extruded foam, especially preferably from an extruded foam produced in a process comprising the following steps:

I) providing a polymer melt in an extruder,

II) introducing at least one blowing agent into the polymer melt provided in step I) to obtain a foamable polymer melt, III) extruding the foamable polymer melt obtained in step II) from the extruder through at least one die aperture into an area at lower pressure, with expansion of the foamable polymer melt to obtain an expanded foam, IV) calibrating the expanded foam from step III) by conducting the expanded foam through a shaping tool to obtain the extruded foam, V) optional material-removing processing of the extruded foam obtained in step IV), where i) the polymer melt provided in step I) optionally comprises at least one additive, and/or ii) at least one additive is optionally added during step II) to the polymer melt and/or between step II) and step III) to the foamable polymer melt, and/or iii) at least one additive is optionally applied during step III) to the expanded foam and/or during step IV) to the expanded foam, and/or iv) at least one layer (S2) is optionally applied to the extruded foam during and/or directly after step IV), and/or vi) at least one carrier layer (TS) is optionally applied to the extruded foam during and/or directly after step IV).

Suitable methods for provision of the polymer melt in the extruder in step I) are in principle all methods known to those skilled in the art; for example, the polymer melt can be provided in the extruder by melting an already ready-polymerized polymer. The polymer can be melted directly in the extruder; it is likewise possible to feed the polymer to the extruder in molten form and thus to provide the polymer melt in the extruder in step I). It is likewise possible that the polymer melt is provided in step I) in that the corresponding monomers required for preparation of the polymer of the polymer melt react with one another in the extruder and hence the polymer melt is provided.

A polymer melt is understood in the present context to mean that the polymer is above the melting temperature ($T_M$) in the case of semicrystalline polymers or the glass transition temperature (TG) in the case of amorphous polymers.

Typically, the temperature of the polymer melt in process step I) is in the range from 100° C. to 450° C., preferably in the range from 150° C. to 350° C. and especially preferably in the range from 160° C. to 300° C.

In step II), at least one blowing agent is introduced into the polymer melt provided in step I). Methods for this purpose are known per se to those skilled in the art.

Suitable blowing agents are selected, for example, from the group consisting of carbon dioxide, alkanes such as propane, isobutane and pentane, alcohols such as methanol, ethanol, 1-propanol, 2-propanol, 1-butanol, 2-butanol, 2-methylpropanol and tert-butanol, ethers such as dimethyl ether, ketones such as acetone and methyl ethyl ketone, halogenated hydrocarbons such as hydrofluoropropene, water, nitrogen and mixtures of these.

In step II), the foamable polymer melt is thus obtained. The foamable polymer melt comprises typically in the range from 1% to 15% by weight of the at least one blowing agent, preferably in the range from 2% to 10% by weight and especially preferably in the range from 3% to 8% by weight, based in each case on the total weight of the foamable polymer melt.

The pressure in the extruder in step II) is typically in the range from 20 to 500 bar, preferably in the range from 50 to 400 bar and especially preferably in the range from 60 to 300 bar.

In step III), the foamable polymer melt obtained in step II) is extruded through at least one die aperture from the extruder into an area at lower pressure, with expansion of the foamable polymer melt to obtain the expanded foam.

Methods of extrusion of the foamable polymer melt are known per se to those skilled in the art.

Suitable die apertures for the extrusion of the foamable polymer melt are all those known to the person skilled in the art. The die aperture may have any desired shape; for example, it may be rectangular, circular, elliptical, square or hexagonal. Preference is given to rectangular slot dies and circular round dies.

In one embodiment, the foamable polymer melt is extruded through exactly one die aperture, preferably through a slot die. In a further embodiment, the foamable polymer melt is extruded through a multitude of die apertures, preferably circular or hexagonal die apertures, to obtain a multitude of strands, the multitude of strands being combined immediately after emergence from the die apertures to form the expanded foam. The multitude of strands can also be combined only in step IV) through the passing through the shaping tool.

Preferably, the at least one die aperture is heated. Especially preferably, the die aperture is heated at least to the glass transition temperature ($T_G$) of the polymer present in the polymer melt provided in step I) when the polymer is an amorphous polymer, and at least to the melting temperature $T_M$ of the polymer present in the polymer melt provided in step I) when the polymer is a semicrystalline polymer; for example, the temperature of the die aperture is in the range from 80° C. to 400° C., preferably in the range from 100° C. to 350° C. and especially preferably in the range from 110° C. to 300° C.

The foamable polymer melt is extruded in step III) into an area at lower pressure. The pressure in the area at lower pressure is typically in the range from 0.05 to 5 bar, preferably in the range from 0.5 to 1.5 bar.

The pressure at which the foamable polymer melt is extruded out of the die aperture in step III) is typically in the range from 20 to 600 bar, preferably in the range from 40 to 300 bar and especially preferably in the range from 50 to 250 bar.

In step IV), the expanded foam from step III) is calibrated by conducting the expanded foam through a shaping tool to obtain the extruded foam.

The calibration of the expanded foam determines the outer shape of the extruded foam obtained in step IV). Methods of calibration are known per se to those skilled in the art.

The shaping tool may be disposed directly at the die aperture. It is likewise possible that the shaping tool is disposed at a distance from the die aperture.

Shaping tools for calibration of the expanded foam are known per se to those skilled in the art. Suitable shaping tools include, for example, sheet calibrators, roller takeoffs, mandrel calibrators, chain takeoffs and belt takeoffs. In order to reduce the coefficient of friction between the shaping tools and the extruded foam, the tools can be coated and/or heated.

The calibration in step IV) thus fixes the geometric shape of the cross section of the extruded foam of the invention in at least one dimension. Preferably, the extruded foam has a virtually orthogonal cross section. If the calibration is partly undertaken only in particular directions, the extruded foam may depart from the ideal geometry at the free surfaces. The thickness of the extruded foam is determined firstly by the die aperture, and secondly also by the shaping tool; the same applies to the width of the extruded foam.

Suitable methods for material-removing processing, in step V), of the extruded foam obtained in step IV) are in principle all methods known to those skilled in the art. For example, the extruded foam can be subjected to material-removing processing by sawing, milling, drilling or planing. When the extruded foam is a thermoplastic foam, thermoforming is additionally possible, by means of which it is possible to avoid material-removing processing with cutting losses and damage to the fibers (F).

Suitable additives are in principle all additives known to those skilled in the art, for example nucleating agents, flame retardants, dyes, process stabilizers, processing aids, light stabilizers and pigments.

With regard to the layer (S2), which in one embodiment is applied to the extruded foam, the elucidations and preferences described hereinbelow apply correspondingly.

The at least one carrier layer (TS) may be identical to the layer (S2) or different from the layer (S2).

The at least one carrier layer (TS) is preferably open-pored, especially preferably a textile, comprising fibers and/or fiber bundles, more preferably an open-meshed non-crimp fabric or woven, most preferably an open-meshed non-crimp fabric or woven of glass fibers, carbon fibers and/or polymer fibers.

The foam according to the invention typically comprises cells. As a result of the preferred production of the foam by an extrusion process, in particular by an extrusion process comprising the steps I) to V), typically at least 50%, preferably at least 80%, more preferably at least 90%, of the cells of the foam are anisotropic.

An anisotropic cell has different dimensions in different spatial directions; the largest dimension of the cell is referred to as the a-direction and the smallest dimension is referred to as the c-direction. The third dimension is referred to as the b-direction. The dimensions of the cells may be determined, for example, by means of optical micrographs or scanning electron micrographs.

The anisotropic properties of the cells preferably also result in anisotropic properties of the foam.

For example at least one of the mechanical properties, preferably all mechanical properties of the foam, may be anisotropic and/or at least one of the elastic moduli, preferably all elastic moduli, of the foam may be anisotropic. Likewise the ratio of the compressive strength in the thickness (z-direction) of the foam to the compressive strength in length (x-direction) of the foam and/or the ratio of the compressive strength in the thickness (z-direction) of the foam to the compressive strength in the width (y-direction) of the foam may be different.

The molding provided in step a) comprises at least one fiber (F) in addition to the foam.

The fiber (F) in step a) is preferably a single fiber or a fiber bundle, preferably a fiber bundle.

It is preferable when the fiber (F) in step a) is not a nonwoven, non-crimp fabric, woven or knit and it is especially preferable when the fiber (F) is not a sheetlike fiber material.

Suitable as the fiber (F) in step a) are all materials capable of forming fibers that are known to those skilled in the art. It is preferable when the fiber (F) in step a) is an organic, inorganic, metallic, ceramic fiber or a combination thereof. A polymeric fiber, basalt fiber, glass fiber, carbon fiber or natural fiber is preferred and a polyaramid fiber, glass fiber, basalt fiber or carbon fiber is especially preferred. A polymeric fiber is preferably a fiber composed of polyester, polyamide, polyaramid, polyethylene, polyurethane, polyvinylchloride, polyamide and/or polyamideimide. A natural fiber is preferably a fiber composed of sisal, hemp, flax, bamboo, coconut and/or jute.

It is preferable when fiber bundles are used as the fiber (F) in step a). The fiber bundles are composed of a plurality of individual fibers (filaments). The number of single fibers per bundle is preferably at least 10, particularly preferably 100 to 100000, especially preferably 300 to 10000, in the case of glass fibers and 1000 to 50000 in the case of carbon fibers and most preferably 500 to 5000 in the case of glass fibers and 2000 to 20000 in the case of carbon fibers.

It is also preferable when the molding in step a) comprises a multitude of fibers (F), particularly preferably of fiber bundles, and/or comprises more than 10 fibers (F) or fiber bundles per $m^2$, preferably more than 1000 per $m^2$, particularly preferably 4000 to 40000 per $m^2$.

The fiber (F) has preferably been introduced into the molding at an angle $\alpha$ relative to the thickness direction (d) of the molding/to the orthogonal (of the surface) of the first side of the molding. The angle $\alpha$ may assume any desired values from 0° to 90°. For example, the fiber (F) has been introduced into the foam at an angle $\alpha$ of 0° to 60°, preferably of 0° to 50°, more preferably of 0° to 15° or of 10° to 70°, in particular of 30° to 60°, more preferably of 30° to 50°, yet more preferably of 30° to 45°, in particular of 45°, relative to the thickness direction (d) of the molding.

In a further embodiment, at least two fibers (F) are introduced at two different angles $\alpha$, $\alpha_1$ and $\alpha_2$, wherein the angle $\alpha_1$ is preferably in the range from 0° to 15° and the second angle $\alpha_2$ is preferably in the range from 30° to 50° liegt; especially preferably $\alpha_1$ is in the range from 0° to 5° and $a_2$ is in the range from 40° to 50°. It is preferable when all fibers (F) in the molding according to the invention have the same angle $\alpha$ or at least approximately the same angle (deviation of not more than +/−5°, preferably +/−2°, particularly preferably +/−1°).

All fibers (F) may be arranged parallel to one another in the molding. It is likewise possible and preferable according to the invention that two or more fibers (F) are arranged in the molding at an angle $\beta$ to one another. In the context of the present invention the angle $\beta$ is to be understood as meaning the angle between the orthogonal projection of a first fiber (F1) onto the surface of the first side of the molding and the orthogonal projection of a second fiber (F2) onto the surface of the molding, wherein both fibers have been introduced into the molding.

The angle $\beta$ is preferably in the range of $\beta=360°/n$, wherein n is an integer. It is preferable when n is in the range from 2 to 6, particularly preferably in the range from 2 to 4. For example, the angle $\beta$ is 90°, 120 or 180°. In a further embodiment, the angle $\beta$ is in the range from 80° to 100°, in the range from 110° to 130° or in the range from 170° to 190°. In a further embodiment, more than two fibers (F) have been introduced at an angle $\beta$ to one another, for example three or four fibers (F). These three or four fibers (F) may each have two different angles $\beta$, $\beta_1$ and $\beta_2$ to the two adjacent fibers. Preferably, all the fibers (F) have the same angles $\beta=\beta_1=\beta_2$ to the two adjacent fibers (F). For example, the angle $\beta$ is 90°, in which case the angle $\beta_1$ between the first fiber (F1) and the second fiber (F2) is 90°, the angle $\beta_2$ between the second fiber (F2) and third fiber (F3) is 90°, the angle $\beta_3$ between the third fiber and fourth fiber (F4) is 90°, and the angle $\beta_4$ between the fourth fiber (F4) and the first fiber (F1) is likewise 90°. The angles $\beta_3$ between the first fiber (F1) (reference) and the second fiber (F2), third fiber (F3) and fourth fiber (F4) are then, in the clockwise sense, 90°, 180° and 270°.

Analogous considerations apply to the other possible angles.

The first fiber (F1) then has a first direction and the second fiber (F2) arranged at an angle $\beta$ to the first fiber (F1) has a second direction. It is preferable when there is a similar number of fibers in the first direction and in the second direction. "Similar" in the present context is to be understood as meaning that the difference between the number of fibers in each direction relative to the other direction is <30%, particularly preferably <10% and especially preferably <2%.

The fibers or fiber bundles may be introduced in irregular or regular patterns. Preference is given to the introduction of fibers or fiber bundles in regular patterns. "Regular patterns" in the context of the present invention is to be understood as meaning that all fibers are aligned parallel to one another and that at least one fiber or fiber bundle has the same distance (a) from all directly adjacent fibers or fiber bundles. It is especially preferable when all fibers or fiber bundles have the same distance from all directly adjacent fibers or fiber bundles.

In a further preferred embodiment the fibers or fiber bundles are introduced such that based on an orthogonal system of coordinates where the thickness direction (d) corresponds to the z-direction they each have the same distance from one another in the x-direction ($a_x$) and the same distance ($a_y$) in the y-direction. It is especially preferable when they have the same distance (a) in the x-direction and in the y-direction, wherein $a=a_x=a_y$.

When two or more fibers (F) are at an angle $\beta$ to one another the first fibers (F1) that are parallel to one another preferably have a regular pattern with a first distance ($a_1$) and the second fibers (F2) that are parallel to one another and are at an angle $\beta$ to the first fibers (F1) preferably have a regular pattern with a second distance ($a_2$). In a preferred embodiment the first fibers (F1) and the second fibers (F2) each have a regular pattern with a distance (a). In that case, $a=a_1=a_2$.

If fibers or fiber bundles are introduced into the foam at an angle $\beta$ to one another, it is preferable that the fibers or fiber bundles follow a regular pattern in each direction.

Based on an orthogonal system of coordinates, the length of the foam of the molding provided in step a) is referred to as the x-direction, the width as the y-direction and the thickness as the z-direction. The x-direction corresponds to the extrusion direction of the extruded foam preferred according to the invention.

The foam may have any desired dimensions. The foam typically has a thickness (z-direction) in the range of 4 to 200 mm, preferably in the range from 5 to 60 mm, a length (x-direction) of at least 200 mm, preferably of at least 400 mm, and a width (y-direction) of at least 200 mm, preferably of at least 400 mm.

The foam typically has a length (x-direction) of not more than 4000 mm, preferably of not more than 2500 mm, and/or a width (y-direction) of not more than 4000 mm, preferably of not more than 2500 mm.

The foam preferably has a density in the range from 10 to 150 kg/m$^3$, particularly preferably in the range from 20 to 100 kg/m$^3$ and especially preferably in the range from 25 to 60 kg/m$^3$. According to the invention the density is determined according to ISO 845 (October 2009 version).

Preferably according to the invention step a) comprises providing a molding in which a fiber region (FB1) of the fiber (F) projects from a side of the molding, particularly preferably a fiber region (FB1) of the fiber (F) projects from a first side of the molding and a fiber region (FB3) of the fiber (F) projects from a second side of the molding.

In this embodiment the fiber region (FB1), the fiber region (FB2) and the fiber region (FB3) may each account for any desired proportion of the total length of the fiber (F). In one embodiment the fiber region (FB1) and the fiber region (FB3) each independently of one another account for 0.1% to 45%, preferably 2% to 40%, particularly preferably 5% to 30%, and the fiber region (FB2) accounts for 10% to 99.8%, preferably 20% to 96%, particularly preferably 40% to 90%, of the total length of a fiber (F) in step a).

In this embodiment it is also preferable when in the molding in step a) the first side of the molding from which the fiber region (FB1) of the fiber (F) projects is opposite the second side of the molding from which the fiber region (FB3) of the fiber (F) projects.

FIG. 1 shows a schematic diagram of a particularly preferred embodiment of the molding made of foam (1) provided in step a) in a perspective view. (2) represents (the surface of) a first side of the molding while (3) represents a second side of the corresponding molding. The first side (2) of the molding is opposite the second side (3) of the molding. The fiber (F) is represented by (4). FIG. 1 shows the preferred embodiment in which one end of the fiber (4a) and thus the fiber region (FB1) projects from the first side (2) of the molding while the other end (4b) of the fiber which constitutes the fiber region (FB3) projects from the second side (3) of the molding. The middle fiber region (FB2) is within the molding and is thus surrounded by the foam. In FIG. 1 the fiber (4) which is for example a single fiber or a fiber bundle, preferably a fiber bundle, is arranged at an angle $\alpha$ relative to the thickness direction (d) of the molding/to the orthogonal (O) of the surface of the first side (2) of the molding. The angle $\alpha$ may assume any values from 0° to 90°, and is normally 0° to 60°, preferably 0° to 50°, particularly preferably 0° to 15° or 10° to 70°, preferably 30° to 60°, in particular 30° to 50°, very particular 30° to 45° in particular 45°. For clarity, FIG. 1 shows just a single fiber (F).

Figure 3:
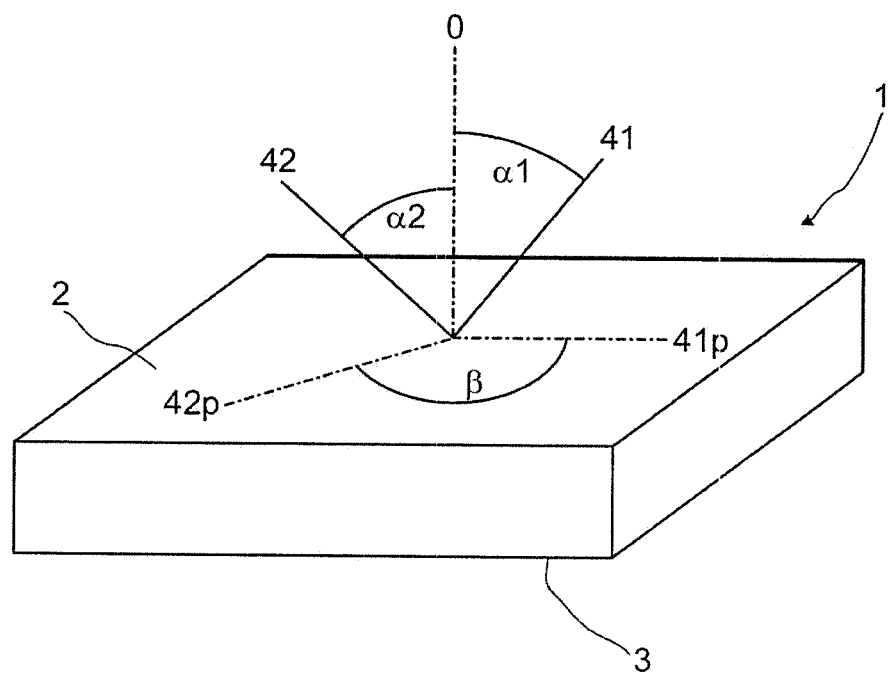

FIG. 3 shows by way of example a schematic diagram of some of the different angles. The molding made from foam (1) shown in FIG. 3 comprises a first fiber (41) and a second fiber (42). In FIG. 3 for clarity only the fiber region (FB1) which in a preferred embodiment projects from the first side (2) of the molding is shown for the two fibers (41) and (42). In FIG. 3 this fiber region is to be understood as an extension of the fiber region (FB2) located inside the molding. The first fiber (41) forms a first angle $\alpha$ ($\alpha_1$) relative to the orthogonal (O) of the surface of the first side (2) of the molding. The second fiber (42) forms a second angle $\alpha$ ($\alpha 2$) relative to the orthogonal (O) of the surface of the first side (2). The orthogonal projection of the first fiber (41), in particular of the fiber region (FB2), onto the first side (2) of the molding (41p) forms the angle $\beta$ with the orthogonal projection of the second fiber (42), in particular of the fiber region (FB2), onto the first side (2) of the molding (42p).

The molding in step a) may be provided by any method known to those skilled in the art. The molding is preferably provided in step a) when at least one fiber (F) is partially introduced into the foam with the result that the fiber (F) is with a fiber region (FB2) located inside the molding and surrounded by the foam while a fiber region (FB1) of the fiber (F) projects from a first side of the molding and a fiber region (FB3) of the fiber (F) projects from a second side of the molding and the fiber region (FB1) and/or the fiber region (FB3) are then optionally removed.

The fiber region (FB1) and/or the fiber region (FB3) may be removed by any method known to those skilled in the art. For example with a pair of scissors or a knife.

Suitable methods of introducing the fiber (F) and/or the fiber bundle include in principle all methods known to those skilled in the art. Suitable processes are described, for example, in WO 2006/125561 or in WO 2011/012587.

It is preferable when the partial introduction of at least one fiber (F) into the foam is effected by sewing-in using a needle and it is especially preferable when the partial introduction is effected by steps a1) bis a6):

a1) optionally applying at least one layer (S2) and optionally applying at least one carrier layer (TS) to at least one side of the foam, a2) producing one hole per fiber (F) in the foam and optionally in the layer (S2) and optionally in the carrier layer (TS), wherein the hole extends from a first side to a second side of the foam and optionally through the layer (S2) and optionally through the carrier layer (TS), a3) providing at least one fiber (F) on the second side of the foam, a4) passing a needle from the first side of the foam through the hole to the second side of the foam and optionally passing the needle through the layer (S2) and optionally passing the needle through the carrier layer (TS), a5) securing at least one fiber (F) to the needle on the second side of the foam and a6) returning the needle along with the fiber (F) through the hole, so that the fiber (F) is with the fiber region (FB2) located inside the molding and surrounded by the foam while the fiber region (FB1) of the fiber (F) projects from a first side of the molding or optionally from the layer (S2) or optionally from the carrier layer (TS) and the fiber region (FB3) of the fiber (F) projects from a second side of the molding, simultaneous performance of steps a2) and a4) being particularly preferred.

When steps a2) and a4) are performed simultaneously the hole from the first side to the second side of the foam is produced by passing a needle from the first side of the foam to the second side of the foam. In this embodiment the introduction of the at least one fiber (F) may comprise for example the following steps:

a1a) optionally applying a layer (S2) and optionally applying at least one carrier layer (TS) to at least one side of the foam, a2a) providing at least one fiber (F) on the second side of the foam, a3a) producing one hole per fiber (F) in the foam and optionally in the layer (S2) and optionally in the carrier layer (TS), wherein the hole extends from the first side to a second side of the foam and optionally through the layer (S2) and optionally through the carrier layer (TS) and wherein the hole is produced by passing a needle through the foam and optionally through the layer (S2) and optionally through the carrier layer (TS), a4a) securing at least one fiber (F) to the needle on the second side of the foam and a5a) returning the needle along with the fiber (F) through the hole, so that the fiber (F) is with the fiber region (FB2) located inside the molding and surrounded by the foam while the fiber region (FB1) of the fiber (F) projects from a first side of the molding or optionally from the layer (S2) or optionally from the carrier layer (TS) and the fiber region (FB3) projects from a second side of the molding.

a6a) optionally cutting off the fiber (F) on the second side and a7a) optionally cutting open the loop of the fiber (F) formed at the needle.

In a preferred embodiment the needle used is a hook needle and at least one fiber (F) is hooked into the hook needle in step a5)/in step a4a).

In a further preferred embodiment, a plurality of fibers (F) are introduced simultaneously into the foam according to the steps described above.

It will be appreciated that the terms "first side" and "second side" are primarily for orientation. The optionally applied layer (S2) and the optionally applied carrier layer (TS) may have been applied on the first side and/or on the second side of the molding. Accordingly the fiber region (FB3) may also project from the layer (S2) and/or the carrier layer (TS).

In step b) of the process according to the invention the molding is at least partially divided at least once, wherein at least one fiber (F) is completely divided to obtain a converted molding.

In the context of the present invention "at least once" is to be understood as meaning that the molding may be at least partially divided precisely once or else may be at least partially divided two or more times.

In the context of the present invention "at least partially" is to be understood as meaning that the molding may be divided partially or completely. When the molding is at least partially divided two or more times it is possible that the molding is divided partially and completely. When the molding is at least partially divided for example three times it is for example possible that the molding is once divided completely and twice divided partially.

In the context of the present invention "at least one fiber" is to be understood as meaning that when the molding comprises two or more fibers (F) precisely one of these two or more fibers (F) may be divided completely while it is equally possible that two or more of these two or more fibers (F) are divided completely.

In the context of the present invention "dividing" is to be understood as meaning the definition according to DIN 8588 (2013).

Thus "dividing" is a type of mechanical separating which does not involve material removal. It is thus a non-material-removing mechanical separation process. In particular in the context of the present invention the term "dividing" is thus to be understood as meaning shear cutting, knife cutting and pinch-cutting.

When the molding provided in step a) is at least a partially divided in step b) a divided area is obtained. The "divided area" is to be understood as meaning the entire area that is newly formed during the at least partial dividing. When in the at least partial dividing a cutting tool is used for example, new areas on both sides of the cutting tool, referred to as a divided area, are formed. In the context of the present invention the "cut area" is to be understood as meaning one half of the divided area. In the case where a cutting tool is used for the at least partial dividing, the cut surface is thus the surface newly formed on one side of the cutting tool.

According to the invention it is thus preferable that the at least partial dividing of the molding in step b) is effected without material removal.

In the context of the present invention "without material removal" ("non-material-removing") is to be understood as meaning that the converted molding obtained in step b) of the process according to the invention is reduced in weight per partial dividing by not more than 1% per cut surface formed during partial dividing based on the total volume of the converted molding, is preferably reduced by not more than 0.4%, particularly preferably by not more than 0.2% and especially preferably by not more than 0.05% compared to the weight of the molding provided in step a), wherein in the determination of the weight of the converted molding and of the molding provided in step a) the mass of the at least one carrier layer (TS) optionally applied between step a) and step b) is not considered.

When the molding is completely divided "without material removal" ("non-material-removing") is in the context of the present invention to be understood as meaning that the sum of the weights of the converted molding obtained in step b) of the process according to the invention and the piece removed therefrom during complete dividing is reduced per complete dividing by not more than 1% per cut surface formed during complete dividing based on the total volume of the converted molding, is preferably reduced by not more than 0.4%, particularly preferably by not more than 0.2% and especially preferably by not more than 0.05% compared to the weight of the molding provided in step a), wherein in the determination of the weight of the converted molding, of the piece removed during dividing and of the molding provided in step a) the mass of the at least one carrier layer (TS) optionally applied between step a) and step b) is not considered.

It is also preferable when the at least partial dividing of the molding in step b) is effected with a cutting tool, preferably with a knife.

It is thus especially preferable when the at least one partial dividing in step b) is a knife cutting, also known as cold cutting.

The at least partial dividing of the molding in step b) may be effected at any desired angle θ relative to the thickness direction (d) of the molding. It is preferable when the at least partial dividing of the molding in step b) is effected at an angle θ in the range from 0° to 90°, preferably in the range from 0° to 5° and/or in the range from 45° to 90°, especially preferably in the range from 0° to 2° and/or in the range from 70° to 90°, in each case relative to the thickness direction (d) of the molding.

When the at least partial dividing of the molding in step b) is effected at an angle θ in the range from 45° to 90°, preferably in the range from 70° to 90°, it is then especially preferable for the at least partial dividing of the molding to be a complete dividing.

It is also preferable when the at least partial dividing of the molding in step b) is effected parallel to the first side of the molding. The molding is then preferably completely divided parallel to the first side of the molding in step b).

It is likewise preferable according to the invention when in step b) the molding is partially divided; in step b) the molding is preferably divided at an angle α in the range from 0° to 45°, preferably in the range from 0° to 10°, especially preferably of 0°, in each case relative to the thickness direction (d) of the molding. It is especially preferable when in step b) the molding is divided at an angle θ in the range from 0° to 45°, preferably in the range from 0° to 10°, especially preferably 0°, in each case relative to the thickness direction (d) of the molding, wherein 0.01 to 5 mm and/or 0.01% to 10%, preferably 0.01 to 2 mm and/or 0.01% to 5%, of the total thickness of the molding remains undivided.

When the molding is partially divided in step b) it is preferable in one embodiment of the present invention when the obtained converted molding comprises units, preferably regular units. It is preferable when these units are rectangular, particularly preferably rectangular with an edge ratio in the range from 1:1 to 1:4, wherein the length of the edge of the longer side is especially preferably 10 mm, more preferably 25 mm.

In the context of the present invention "units" is to be understood as meaning regions in the converted molding which as a result of the at least partial dividing of the molding in step b) are separated from the other regions by the introduced cuts. When the molding has been completely divided in step b) it is then preferable for the units to be held together by the at least one carrier layer (TS) applied in a particularly preferred embodiment.

In the context of the present invention "regular units" is to be understood as meaning that adjacent units have identical edge lengths. Edge lengths are to be understood as meaning the length of the cut independently of the depth of the cut.

The regular units preferably have a square or a rectangular shape, they are preferably rectangular.

Figure 4A:
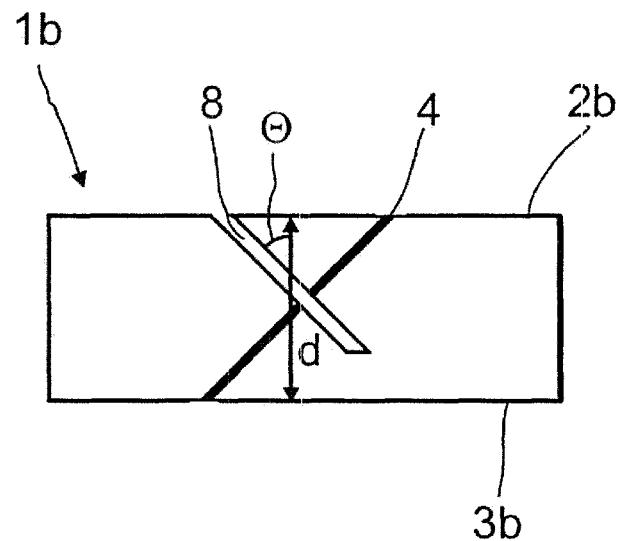

FIG. 4a shows an exemplary schematic representation of a converted molding (1b) produced according to the invention in a side elevation. (2b) represents (the surface of) a first side of the converted molding while (3b) represents a second side of the converted molding. The first side (2b) of the converted molding is opposite the second side (3b) of the converted molding. The converted molding shown in FIG. 4a has no fiber region (FB1) or (FB3). These fiber regions may either have been removed before performance of the process according to the invention or have been separated from the converted molding by complete dividing of the molding. The fiber (4) is located in the foam and has been completely divided by the partial dividing of the molding. The partial dividing has formed a slot (8). This slot (8) has been introduced into the converted molding at an angle θ relative to the thickness direction (d). For clarity, FIG. 4a shows only one fiber (4).

Figure 4B:
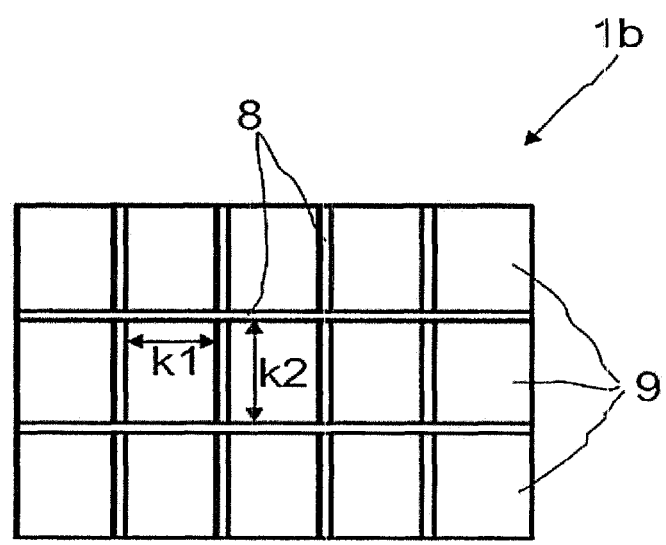

FIG. 4b shows a view along the thickness direction (d) of a preferred embodiment of the converted molding (1b) according to the invention. In this preferred embodiment the molding has been partially divided in step b) to obtain slots (8). The converted molding (1b) comprises regular units (9) separated from one another by the slots (8). The units have a longer side having an edge length (k2) and a shorter side having an edge length (k1). For clarity the converted molding according to FIG. 4b does not show a fiber (F). Furthermore, also for clarity, only some of the regular units in FIG. 4b have been labelled with the reference numeral (9).

It is also preferable according to the invention when between step a) and step b) of the process according to the invention at least one carrier layer (TS) is applied to the molding. It is preferable when between step a) and step b) a carrier layer (TS) is applied to the molding and in step b) the molding is completely divided, wherein the carrier layer (TS) is not divided. The carrier layer (TS) is preferably open-pored, especially preferably a textile, comprising fibers and/or fiber bundles, more preferably an open-meshed non-crimp fabric or woven, most preferably an open-meshed non-crimp fabric or woven of glass fibers, carbon fibers and/or polymer fibers.

It will be appreciated that in this embodiment when two carrier layers (TS) are applied to the molding on opposite sides for example it is preferable when one of the carrier layers (TS) is completely divided together with the molding while the other carrier layer (TS) is not divided.

As already described hereinabove the at least one carrier layer (TS) may be applied to the preferred extruded foam for example during and/or directly after step IV) of the preferred process for producing an extruded foam.

In step b) the converted molding is obtained.

The converted molding obtained in step b) comprises a foam and at least one fiber (F).

In terms of the foam the above-described elucidations and preferences for the foam of the molding provided in step a) apply correspondingly.

When the molding provided in step a) additionally comprises at least one layer (S2) and/or at least one carrier layer (TS) the converted molding may likewise comprise the at least one layer (S2) and/or the at least one carrier layer (TS).

The converted molding may likewise comprise the at least one carrier layer (TS) when said layer is applied to the molding between steps a) and b).

It will be appreciated that when the molding is completely divided at least once in step b) the foam of the converted molding may have a smaller thickness (z-direction) and/or a smaller length (x-direction) and/or a smaller width (y-direction) than the foam of the molding provided in step a). For example the foam of the converted molding has a thickness (z-direction) in the range from 2 to 100 mm, preferably in the range from 5 to 60 mm, a length (x-direction) in the range from 10 to 2450 mm, preferably in the range from 100 to 1300 mm, and a width (y-direction) in the range from 10 to 2450 mm, preferably in the range from 100 to 1300 mm.

In one embodiment the foam of the converted molding has a length (x-direction) of not more than 3000 mm, preferably of not more than 2500 mm, and/or a width (y-direction) of not more than 3000 mm, preferably of not more than 2500 mm.

The elucidations and preferences described hereinabove for the at least one fiber (F) present in the molding provided in step a) likewise apply correspondingly to the fiber (F).

When the molding is partially divided at least once in step b) the obtained converted molding comprises slots and/or grooves.

Slots and grooves and the differences therebetween are known to those skilled in the art. In the context of the present invention slots and grooves are to be understood as meaning depressions introduced into the molding by the at least partial dividing of the molding in step b). Slots and grooves differ from one another in terms of the ratio of the average width of the depression to the average depth of the depression. The depressions (slots and/or grooves) may be introduced precisely on one side of the molding but it is likewise possible to introduce the depression on two or more sides of the molding. When the depressions are introduced on two or more sides of the molding it is preferable for at least two of the sides in which the depressions are introduced to be opposite one another.

Slots are to be understood as meaning depressions having an average width smaller than their average depth. For example the ratio of average depth to average width is in the range from 10 to 10000, preferably in the range from 50 to 1000.

The advantage of slots is that they allow conformal reproduction of surfaces, the slotted material being flipped open according to the predefined contour. This makes it possible for example to compensate the onesided length variation of the outer layers of a panel and the curvature resulting therefrom. The option of flipping open is defined by the slot depth and it is therefore preferable to generate the deepest possible cut, preferably between ⅔ of the material thickness up to the complete material thickness. The slot width plays only a secondary role for conformal shaping but is very significant for the resin absorption of the panel and thus for weight and should therefore be kept as low as possible/necessary.

Grooves are to be understood as meaning depressions where the average width is approximately identical to the average depth. For example the ratio of average depth to average width is in the range from 0.2 to 5, preferably in the range from 0.5 to 2.

Grooves are in particular advantageous when using vacuum infusion to produce a panel from the converted molding. The grooves allow a better distribution of the liquid resin during the vacuum infusion process. The grooves are typically introduced into the foam with a width of about 2 to 3 mm and a depth of about 1 to 2 mm, ideally in a crossed or striped pattern.

An exemplary molding having a slot (8) is shown in FIGS. 4a and 4b which have already been described hereinabove.

When the molding is completely divided at least once in step b) the converted molding obtained in step b) may for example comprise scarfings.

"Scarfings" are to be understood as meaning thickness transitions inside the converted molding.

When the molding is partially divided two or more times in step b) units, preferably regular units, as shown in FIG. 4b and described hereinabove are obtained as described hereinabove.

The present invention thus also provides a converted molding obtainable by the process according to the invention.

It is preferable when the converted molding obtainable by the process according to the invention comprises a carrier layer (TS). The abovedescribed elucidations and preferences apply correspondingly to the carrier layer.

The present invention also provides a panel comprising at least one converted molding according to the invention and at least one layer (S1).

A "panel" may also be referred to among specialists in the art as a "sandwich", "sandwich material", "laminate" and/or "composite article".

In a preferred embodiment of the panel the panel comprises two layers (S1) and the two layers (S1) are each attached at a side of the converted molding that is opposite the respective other side of the converted molding.

In one embodiment of the panel according to the invention the layer (S1) comprises at least one resin, the resin preferably being a reactive thermosetting or thermoplastic resin, the resin more preferably being based on epoxides, acrylates, polyurethanes, polyamides, polyesters, unsaturated polyesters, vinyl esters or mixtures thereof, the resin in particular being an amine-curing epoxy resin, a latent-curing epoxy resin, an anhydride-curing epoxy resin or a polyurethane composed of isocyanates and polyols. Such resin systems are known to those skilled in the art, for example from Penczek et al. (Advances in Polymer Science, 184, pages 1-95, 2005), Pham et al. (Ullmann's Encyclopedia of Industrial Chemistry, Vol. 13, 2012), Fahnler (Polyamides, Kunststoff Handbuch 3/4, 1998) and Younes (WO12134878 A2).

Preference is also given in accordance with the invention to a panel in which
  i) the fiber region (FB1) of the fiber (F) is in partial or complete contact, preferably complete contact, with the first layer (S1), and/or
  ii) the fiber region (FB3) of the fiber (F) is in partial or complete contact, preferably complete contact, with the second layer (S1), and/or
  iii) the panel comprises between at least one side of the converted molding and at least one layer (S1) at least one layer (S2), wherein the layer (S2) is preferably composed of sheetlike fiber materials or polymeric films, particularly preferably of glass fibers or carbon fibers in the form of nonwovens, non-crimp fabrics or wovens.

In a further inventive embodiment of the panel, the at least one layer (S1) additionally comprises at least one fibrous material, wherein
  i) the fibrous material comprises fibers in the form of one or more plies of chopped fibers, nonwovens, non-crimp fabrics, knits and/or wovens, preferably in the form of non-crimp fabrics or wovens, particularly preferably in the form of non-crimp fabrics or wovens having a basis weight per non-crimp fabric/woven of 150 to 2500 g/m$^2$, and/or
  ii) the fibrous material comprises fibers of organic, inorganic, metallic or ceramic fibers, preferably polymeric fibers, basalt fibers, glass fibers, carbon fibers or natural fibers, particularly preferably glass fibers or carbon fibers.

The elucidations described above also apply to the natural fibers and the polymeric fibers.

A layer (S1) additionally comprising at least one fibrous material is also referred to as a fiber-reinforced layer, in particular as a fiber-reinforced resin layer provided that the layer (S1) comprises a resin.

It is also preferable when the panel has an at least singly curved surface. It is particularly preferable when the panel has an at least singly curved surface having at least a curvature radius of ≤50 m, preferably ≤20 m, more preferably ≤5 m. The curvature radius of the at least singly curved surface is typically >0.2 m, preferably >0.5 m, more preferably >1 m.

The curvature radius is known to those skilled in the art. The curvature radius is the radius of the circle of curvature of a particular point P on a plane curve. The circle of curvature of a particular point P on a plane curve is the circle which the curve best approximates at this point. Its radius, the curvature radius, is the magnitude of the reciprocal of the curvature of the curve at point P. The tangent of the circle of curvature at this point coincides with the tangent of the curve. Since the curvature of a curve generally varies with location the curve generally only fits the circle of curvature in an infinitesimally small environment. These concepts are known from the mathematics of three-dimensional surfaces.

In the context of the present invention "an at least singly curved surface" is to be understood as meaning either precisely one at least singly curved surface or else two or more at least singly curved surfaces.

In the context of the present invention "at least singly curved" is to be understood as meaning either precisely singly curved or else doubly curved.

It is preferable when the at least one curved surface is one of the surfaces comprising the layer (S1).

It is also preferable when the thickness of the panel varies over the width and/or over the length of the panel. It is preferable when the thickness of the panel varies over the width and/or over the length of the panel by at least 0.5 mm/m, more preferably by at least 1 mm/m, yet more preferably by at least 5 mm/m, most preferably by at least 10 mm/m.

The thickness of the panel varies over the width and/or over the length of the panel preferably by not more than 2000 mm/m, more preferably by not more than 1000 mm/m.

When the thickness of the panel varies over the width and/or of the length of the panel the thickness of the panel may vary over the entire width and/or over the entire length of the panel. It is likewise possible for the thickness of the panel to vary only over a subregion of the width and/or over a subregion of the length.

The variation in the thickness of the panel over the width and/or over the length of the panel typically results from the variation in the thickness of the converted molding present therein over its width and/or over its length. A variation in the thickness of the layer (S1) of the panel and of the optionally present layer (S2) may likewise result in a variation in the thickness of the panel over the width and/or over the length of the panel.

Figure 2A:
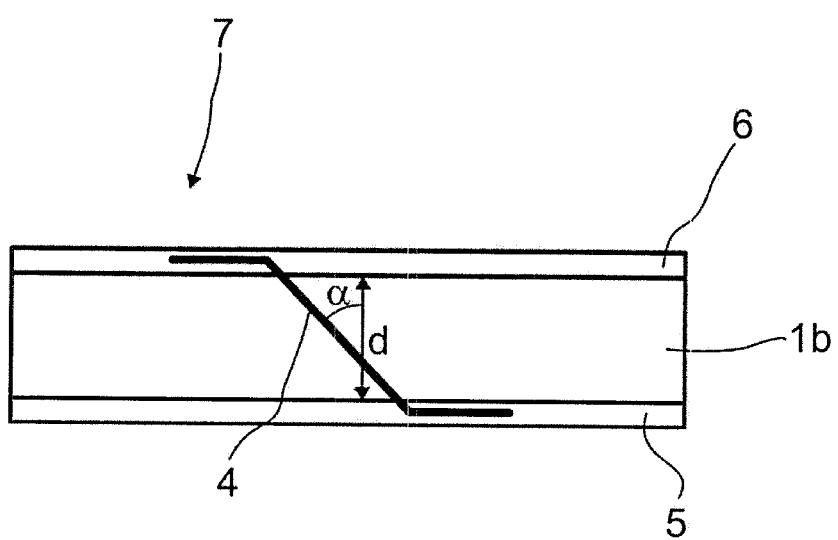

FIG. 2 shows in a two-dimensional side view of a panel (7) according to the invention which comprises a converted molding (1b) according to the invention as detailed for example hereinabove in the context of the elucidations for FIGS. 4a and 4b. Unless otherwise stated the reference numerals and other abbreviations in FIGS. 2a, 4a and 4b have the same meanings. For clarity, FIG. 2a does not show a slot (8).

In the embodiment according to FIG. 2a, the panel according to the invention comprises two layers (S1) represented by (5) and (6). The two layers (5) and (6) are each on mutually opposite sides of the converted molding (1b). The two layers (5) and (6) are preferably resin layers or fiber-reinforced resin layers. As is further discernible from FIG. 2a the converted molding is a converted molding which additionally comprises a fiber region (FB1) and a fiber region (FB3). These two fiber regions (ends of the fibers (4)) are surrounded by the respective layers (5) and (6).

One or more further layers may also be present between the converted molding (1b) and the first layer (5) and/or between the converted molding (1b) and the second layer (6). As described hereinabove for FIG. 1 and FIG. 4a, for simplicity FIG. 2a also shows only a single fiber (F) represented by reference numeral reference 4. With regard to the number of fibers or fiber bundles in practice, that which is elucidated above for FIG. 1 applies analogously.

Figure 2B:
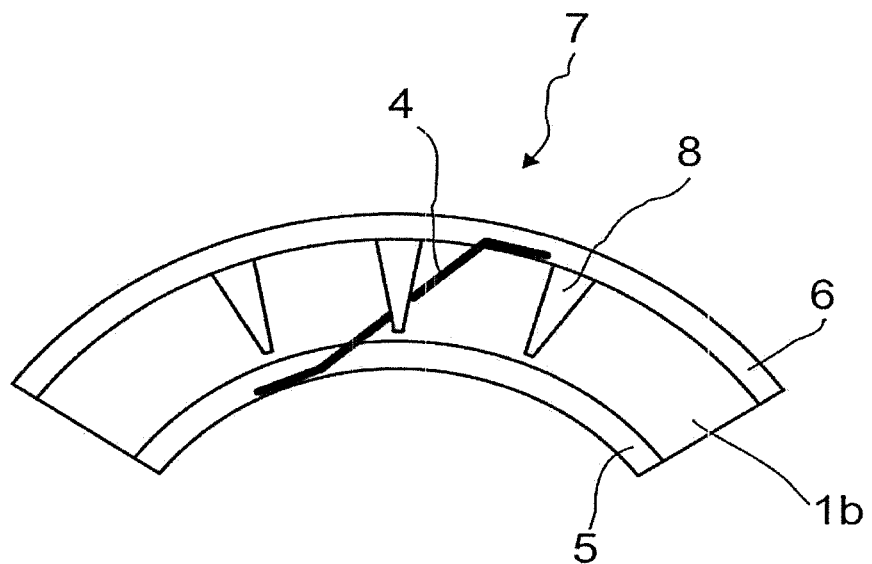

FIG. 2b shows a further preferred embodiment of the panel (7) according to the invention, wherein the panel is shown in a side view and has a singly curved surface. In the production of the panel (7) starting from the converted molding (1b) the slots (8) introduced into the converted molding (1b) are spread to obtain the curved surface of the panel. The slots (8) may be filled with resin in the panel according to the invention. The elucidations recited for the reference numerals in FIG. 2a apply correspondingly to the reference numerals and other abbreviations in FIG. 2b.

The present invention further provides a process for producing the panel according to the invention in which the at least one layer (S1) is produced, applied and cured on a converted molding according to the invention in the form of a reactive viscous resin, preferably by liquid impregnation methods, particularly preferably by pressure- or vacuum-assisted impregnation methods, especially preferably by vacuum infusion or pressure-assisted injection methods, most preferably by vacuum infusion. Liquid impregnation methods are known per se to those skilled in the art and are described in detail, for example, in *Wiley Encyclopedia of Composites* (2nd Edition, Wiley, 2012), Parnas et al. (*Liquid Composite Moulding*, Hanser, 2000) and Williams et al. (*Composites Part A*, 27, p. 517-524, 1997).

Various auxiliary materials can be used for producing the panel according to the invention. Suitable auxiliary materials for production by vacuum infusion include, for example, vacuum film, preferably made of nylon, vacuum sealing tape, flow aids, preferably made of nylon, separation film, preferably made of polyolefin, tearoff fabric, preferably made of polyester, and a semipermeable film, preferably a membrane film, particularly preferably a PTFE membrane film, and absorption fleece, preferably made of polyester. The choice of suitable auxiliary materials is guided by the component to be manufactured, the process chosen and the materials used, specifically the resin system. In the case of use of resin systems based on epoxide and polyurethane, preference is given to using flow aids made from nylon, separation films made from polyolefin, tearoff fabric made from polyester, and semipermeable films made of PTFE membrane films, and absorption fleeces made from polyester.

These auxiliary materials can be used in various ways in the processes for producing the panel according to the invention. It is particularly preferable when panels are produced from the converted moldings by applying fiber-reinforced outer plies by means of vacuum infusion. In a typical construction, to produce the panel according to the invention, fibrous materials and optionally further layers are applied to the top side and the bottom side of the converted molding. Subsequently, tearoff fabric and separation films are positioned. The infusion of the liquid resin system may be carried out using flow aids and/or membrane films. Particular preference is given to the following variants:

i) use of a flow aid on just one side of the construction, and/or
ii) use of a flow aid on both sides of the construction, and/or
iii) construction with a semipermeable membrane (VAP construction); the latter is preferably draped over the full area of the molding, on which flow aids, separation film and tearoff fabric are used on one or both sides, and the semipermeable membrane is sealed with respect to the mold surface by means of vacuum sealing tape, the absorption fleece is inserted on the side of the semipermeable membrane remote from the molding, as a result of which the air is evacuated upward over the full area, and/or
iv) use of a vacuum pocket made from membrane film, which is preferably positioned at the opposite gate side of the molding, by means of which the air is evacuated from the opposite side to the gate.

The construction is subsequently equipped with gates for the resin system and gates for the evacuation. Finally, a vacuum film is applied over the entire construction and sealed with sealing tape, and the entire construction is evacuated. After the infusion of the resin system, the reaction of the resin system takes place with maintenance of the vacuum.

The present invention also provides for the use of the converted molding according to the invention or of the panel according to the invention for rotor blades in wind turbines, in the transport sector, in the construction sector, in automobile construction, in shipbuilding, in rail vehicle construction, for container construction, for sanitary installations and/or in aerospace.

The present invention is illustrated hereinafter by examples.

EXAMPLES

Characterization

The properties of the foams, of the moldings, of the converted moldings and of the panels are determined as follows:

Smallest dimension of the cell (c-direction):

The smallest dimension of the cells is determined by statistical analysis of the micrographs analogously to anisotropy.

Density:

The density of the pure foams is determined according to ISO 845 (October 2009 version).

Resin Absorption:

For resin absorption, foams are compared after material has been removed from the surface by planing. In addition to the employed resin systems, the foam slabs and glass non-crimp fabrics, the following auxiliary materials are used: nylon vacuum film, vacuum sealing tape, nylon flow aid, polyolefin separation film, polyester tearoff fabric and PTFE membrane film and polyester absorption fleece. Panels are produced from the moldings by applying fiber-reinforced outer plies by means of vacuum infusion. Applied to each of the top side and the bottom side of the foams are two plies of Quadrax glass non-crimp fabric (roving: E-Glass SE1500, OCV; textile: Saertex, isotropic laminate [0°/−45°/90°45°] of 1200 g/m$^2$ in each case). For the determination of the resin absorption a separation film is inserted between the foam and the glass non-crimp fabric, in contrast with the standard production of the panels. In this way, the resin absorption of the pure foam is determinable. The tearoff fabric and the flow aids are attached on either side of the glass non-crimp fabrics. The construction is subsequently equipped with gates for the resin system and gates for the evacuation. Finally, a vacuum film is applied over the entire construction and sealed with sealing tape, and the entire construction is evacuated. The construction is prepared on an electrically heatable table having a glass surface.

The resin system used is amine-curing epoxy (resin: BASF Baxxores 5400, curing agent: BASF Baxxodur 5440, mixing ratio and further processing as per data sheet). After the mixing of the two components the resin is evacuated at down to 20 mbar for 10 minutes. Infusion onto the pre-temperature-controlled construction is effected at a resin temperature of 23+/−2° C. (table temperature: 35° C.). By means of a subsequent temperature ramp of 0.3 K/min from 35° C. to 75° C. and isothermal curing at 75° C. for 6 h, it is possible to produce panels consisting of the moldings and glass fiber-reinforced outer plies.

The foams are initially analyzed according to ISO 845 (October 2009 version) to obtain the apparent density of the foam. After the resin system has cured, the processed panels are trimmed in order to eliminate excess resin accumulations in the edge regions as a result of imperfectly fitting vacuum film.

The outer plies are then removed and the foams present are analyzed according to ISO 845. The difference in the densities gives the absolute resin absorption. Multiplication by the thickness of the foam then gives the corresponding resin absorption in kg/m$^2$.

Production of the Foam and of the Molding

The film was produced as a sheet in a tandem extrusion plant. The melting extruder (ZSK 120) was supplied continuously with polyphenylene ether masterbatch (PPE/PS masterbatch, Noryl C6850, Sabic) and polystyrene (PS 148H, BASF), in order to produce an overall blend consisting of 25 parts PPE and 75 parts PS. In addition, additives such as talc (0.2 parts) were metered in via the intake as a PS masterbatch (PS 148H, BASF). Blowing agents ($CO_2$, ethanol and i-butane) are injected into the injection port under pressure. The total throughput including the blowing agents and additives is 750 kg/h. The blowing agent-containing melt is cooled down in a downstream cooling extruder (ZE 400) and extruded through a slot die. The foaming melt is taken off by a heated calibrator, the surfaces of which have been coated with Teflon, via a conveyor belt and formed to slabs. Typical slab dimensions prior to mechanical processing are about width 800 mm (y direction) and thickness 60 mm (z direction). The sheets were then trimmed to 20 mm for the reinforcement. The properties of the thus obtained foam (BS1) are reported in table 1

TABLE 1

|  |  | BS1 |
| --- | --- | --- |
| Production process | (—) | extrusion |
| Polymer | (—) | PPE/PS |
| c-direction | (mm) | 0.07 |
| z direction | (mm) | 20 |
| Resin absorption | (kg/m$^2$) | 0.2 |
| Density | (kg/m$^3$) | 40 |

The thus obtained foam (BS1) is reinforced with glass fibers (rovings, E-Glas, 900 tex, 3B). The glass fibers are introduced in the form of rovings at an angle α of 45° in four different spatial directions at an angle β of 90° to one another. The glass fibers have been introduced in a regular rectangular pattern with equal distances $a_1=a_2=16$ mm. In addition, on both sides about 5.5 mm of the glass fibers are left to overhang at the outer ply to improve the bonding to the glass fiber mats introduced later as outer plies. The fibers/fiber rovings are introduced in an automated manner by a combined sewing/crochet process. First of all, a hook needle (diameter of about 1.1 mm) is used to penetrate completely from the first side to the second side of the foam. On the second side a roving is hooked into the hook of the hook needle and then pulled from the second side through the hole and back to the first side of the foam. Finally, the roving is cut off on the second side and the roving loop formed is cut open at the needle. The hook needle is thus ready for the next operation.

Converting of the Foams a) Introduction of Slots

Slots were introduced into the obtained fiber-reinforced foams (moldings) with a spacing of 25 mm×50 mm and a slot depth of 16 mm. In the inventive example B1 a knife blade (geometry: width 0.5 mm, cutting angle 18°, compressed to 26° for 0.1 to 0.2 mm at the cutting edges) was applied to a matrix and at an angle of 17° to 18° drawn through the molding at a rate of 30 m/min. In comparative example V2 the slots were introduced via a rotating saw blade (geometry: diameter 250 mm, thickness 0.8 mm, 28 teeth, from Miear, no. 45540) at a rotational speed of 4000 rpm and an advancing rate of 20 to 30 m/min.

The results may be found in table 2.

TABLE 2

|  | B1 | V2 |
| --- | --- | --- |
| Slot width | 0.3 mm | 1.1 mm |
| Slot quality | constant thickness, no damage to foam, smooth cut edge | damage to foam, rough surface, uneven thickness, abraded material in slot |
| Emission | few, if any, particles, no chunks of the foam | chunks of the foam and of the fibers, pulled-out fibers, temperature profile at the foam |
| pulled-out fibers | no | individual fibers and in some cases fiber bundles partially or completely pulled out | b) Scarfing of Moldings

Scarfings were introduced into the fiber-reinforced foams (moldings) produced previously. Example B3 employed a splitting machine which divides the molding using a rotary knife belt (geometry: depth 80 mm, thickness 1 mm, length 8000 mm, phase 2×8°). The knife is continually sharpened during operation. The molding is held on a vacuum table. The scarfing angle is 2°

Comparative example V4 employed a horizontal wire cutting machine with a vacuum table. A wedge-shaped scarfing was cut out at an angle of 3° at a rotational speed of 61 m/s and an advancing rate of 0.25 m/min. The results are reported in table 3.

TABLE 3

|  | B3 | V4 |
| --- | --- | --- |
| Scarfing quality | very good surface, cleanly divided fibers, no damage to foam, exact adherence to scarfing angle, surface partially closed again | damage to foam, fibers in wire direction only deflected and not divided, burnt areas in foam, large local deviations in scarfing angle. |
| Emission | few, if any, particles, no chunks of the foam | chunks of the foam and of the fibers, pulled-out fibers, temperature profile at the foam |
| pulled-out fibers | no | individual fibers and in some cases fiber bundles partially or completely pulled out | c) Smoothing/Surficial Removal of Fibers in the Moldings

The previously produced fiber-reinforced foams (moldings) were smoothed by surficial removal of the fibers.

Example B5 employed a splitting machine which divides the molding using a rotary knife belt (geometry: depth 80 mm, thickness 1 mm, length 8000 mm, phase 2×8°). The knife was continually sharpened during operation. The moldings were held on a vacuum table and between 0.3 and 1.5 mm of foam were removed.

Comparative example V6 employed a horizontal wire cutting machine with a vacuum table. The rotational speed was 61 m/s at an advancing rate of 0.25 m/min.

The results can be seen in table 4.

TABLE 4

|  | B5 | V6 |
| --- | --- | --- |
| Cut quality | very good surface, cleanly divided fibers, no damage to foam, surface partially closed again | damage to foam, fibers in wire direction only deflected and not divided, burnt areas in foam, large local deviations in the cut. |
| Emission | few, if any, particles, no chunks of the foam | chunks of the foam and of the fibers, pulled-out fibers, temperature profile at the foam |

TABLE 4-continued

| | B5 | V6 |
|---|---|---|
| pulled-out fibers | no | individual fibers and in some cases fiber bundles partially or completely pulled out |

The invention claimed is:

1. A process for converting a molding comprising the following steps a) and b):a) providing a molding comprising a foam and at least one fiber (F), wherein the fiber (F) is with a fiber region (FB2) located inside the molding and surrounded by the foam, b) at least partially dividing the molding at least once, wherein at least one fiber (F) is completely divided to obtain a converted molding, wherein in step a) the molding is provided when at least one fiber (F) is partially introduced into the foam with a result that the fiber (F) is with the fiber region (FB2) located inside the molding and surrounded by the foam while a fiber region (FBI) of the fiber (F) projects from a first side of the molding and a fiber region (FB3) of the fiber (F) projects from a second side of the molding and the fiber region (FB1) and/or the fiber region (FB3) are then optionally removed, wherein partial introduction is optionally effected by steps a1) to a6): a1) optionally applying at least one layer (S2) and optionally applying at least one carrier layer (TS) to at least one side of the foam, a2) producing one hole per fiber (F) in the foam and optionally in the layer (S2) and optionally in the carrier layer (TS), wherein the hole extends from a first side to a second side of the foam and optionally through the layer (S2) and optionally through the carrier layer (TS), a3) providing at least one fiber (F) on the second side of the foam, a4) passing a needle from the first side of the foam through the hole to the second side of the foam and optionally passing the needle through the layer (S2) and optionally passing the needle through the carrier layer (TS), a5) securing at least one fiber (F) to the needle on the second side of the foam and a6) returning the needle along with the fiber (F) through the hole, so that the fiber (F) is with the fiber region (FB2) located inside the molding and surrounded by the foam while the fiber region (FB1) of the fiber (F) projects from a first side of the molding or optionally from the layer (S2) or optionally from the carrier layer (TS) and the fiber region (FB3) of the fiber (F) projects from a second side of the molding, wherein the at least partial dividing of the molding in step b) is effected with a cutting tool wherein the at least partial dividing of the molding in step b) is effected without material removal-, wherein the fiber region (FB 1) and the fiber region (FB3) each independently of one another account for 0.1% to 45% and the fiber region (FB2) accounts for 10% to 99.8% of the total length of a fiber (F) in step a).

2. The process according to claim 1, wherein the at least partial dividing of the molding in step b) is effected with a knife.

3. The process according to claim 1, wherein
  i) the at least partial dividing of the molding in step b) is effected at an angle 6 in the range from 0° to 90° relative to the thickness direction (d) of the molding,
  ii) the at least partial dividing of the molding in step b) is effected parallel to the first side of the molding, the molding optionally being completely divided parallel to the first side of the molding in step b), or
  iii) the molding is partially divided in step b), the molding in step b) being divided at an angle θ in the range from 0° to 45° relative to the thickness direction (d) of the molding, wherein 0.01 to 5 mm or 0.01% to 10%, of the total thickness of the molding remains undivided, or
  iv) the molding is partially divided in step b) so that the obtained converted molding comprises units, the units being rectangular or
  v) between step a) and step b) at least one carrier layer (TS) is applied to the molding, wherein optionally between step a) and step b) at least one carrier layer (TS) is applied to the molding and in step b) the molding is completely divided, wherein the carrier layer (TS) is not divided, the carrier layer (TS) optionally being open-pored.

4. The process according to claim 1, wherein the foam has been produced from a particle foam, an extruded foam, a reactive foam or a batch foam.

5. The process according to claim 1, wherein the foam is based on at least one polymer selected from the group consisting of polystyrene, polyester, polyphenylene oxide, a copolymer produced from phenylene oxide, a copolymer produced from styrene, polyaryl ether sulfone, polyphenylene sulfide, polyaryl ether ketone, polypropylene, polyethylene, polyamide, polyamide imide, polyether imide, polycarbonate, polyacrylate, polylactic acid, polyvinyl chloride, polyurethane, and mixtures thereof.

6. The method according to claim 1, wherein
  i) the fiber (F) in step a) is a single fiber or a fiber bundle, or
  ii) the fiber (F) in step a) is an organic, inorganic, metallic or ceramic fiber or a combination thereof, or
  iii) the fiber (F) in step a) is employed in the form of a fiber bundle having a number of individual fibers per bundle of at least 10 in the case of glass fibers and 1000 to 50000 in the case of carbon fibers, or
  iv) the fiber region (FB1) and the fiber region (FB3) each independently of one another account for 0.1% to 45% and the fiber region (FB2) accounts for 10% to 99.8% of the total length of a fiber (F) in step a), or
  v) the fiber (F) in step a) has been introduced into the foam at an angle a of 00 to 600 relative to the thickness direction (d) of the molding or
  vi) in the molding in step a) the first side of the molding from which the fiber region (FB1) of the fiber (F) projects is opposite the second side of the molding from which the fiber region (FB3) of the fiber (F) projects or
  vii) the molding in step a) comprises a multiplicity of fibers (F) or comprises more than 10 fibers (F) or fiber bundles per m².

7. The process according to claim 1, wherein the steps a2) and a4) are performed simultaneously.

8. A converted molding obtained by the process according to claim 1.

9. The converted molding according to claim 8 wherein the converted molding comprises a carrier layer (TS).

10. A panel comprising at least one converted molding according to claim 8 and at least one layer (SI).

11. The panel according to claim 10, wherein the layer (SI) comprises at least one resin.

12. The panel according to claim 10, wherein the layer (S1) additionally comprises at least one fibrous material, where
  i) the fibrous material comprises fibers in the form of one or more plies of chopped fibers, nonwovens, non-crimp fabrics, knits or wovens, or
  ii) the fibrous material comprises organic, inorganic, metallic or ceramic fibers.

13. The panel according to claim 10, wherein
i) the fiber region (FB1) of the fiber (F) is in partial or complete, preferably complete, contact with the layer (S1), or
ii) the panel comprises between at least one side of the converted molding and at least one layer (S1) at least one layer (S2), wherein the layer (S2) is composed of sheetlike fiber materials or polymeric films, or
iii) the panel comprises two layers (S1) and the two layers (S1) are each attached at a side of the converted molding that is opposite the respective other side of the converted molding, or
iv) the panel has an at least singly curved surface, or
v) the thickness of the panel varies over the width or over the length of the panel by at least 0.5 mm/m.

14. A process for producing a panel according to claim 10, wherein the at least one layer (S1) is produced, applied and cured on a converted molding in the form of a reactive viscous resin, by liquid impregnation methods.

15. A rotor blade for a wind turbine comprising the converted molding according to claim 8.

16. The process according to claim 1, wherein the foam has been produced from an extruded foam produced in a process comprising the following steps:
I) providing a polymer melt in an extruder,
II) introducing at least one blowing agent into the polymer melt provided in step I) to obtain a foamable polymer melt,
III) extruding the foamable polymer melt obtained in step II) from the extruder through at least one die aperture into an area at lower pressure, with expansion of the foamable polymer melt to obtain an expanded foam,
IV) calibrating the expanded foam from step III) by conducting the expanded foam through a shaping tool to obtain the extruded foam, and
V) optional material-removing processing of the extruded foam obtained in step IV),
wherein
i) the polymer melt provided in step I) optionally comprises at least one additive, or
ii) at least one additive is optionally added during step II) to the polymer melt or between step II) and step III) to the foamable polymer melt, or
iii) at least one additive is optionally applied during step III) to the expanded foam and/or during step IV) to the expanded foam, or
iv) at least one layer (S2) is optionally applied to the extruded foam during or directly after step IV), or
at least one carrier layer (TS) is optionally applied to the extruded foam during or directly after step IV).

17. A process comprising: producing a foam molding from an extruded foam produced in a process comprising the following steps: I) providing a polymer melt in an extruder, II) introducing at least one blowing agent into the polymer melt provided in step I) to obtain a foamable polymer melt, III) extruding the foamable polymer melt obtained in step II) from the extruder through at least one die aperture into an area at lower pressure, with expansion of the foamable polymer melt to obtain an expanded foam, TV) calibrating the expanded foam from step III) by conducting the expanded foam through a shaping tool to obtain the extruded foam, and V) optional material-removing processing of the extruded foam obtained in step TV), wherein i) the polymer melt provided in step I) optionally comprises at least one additive, or ii) at least one additive is optionally added during step II) to the polymer melt or between step II) and step III) to the foamable polymer melt, or iii) at least one additive is optionally applied during step III) to the expanded foam and/or during step TV) to the expanded foam, or iv) at least one layer (S2) is optionally applied to the extruded foam during or directly after step TV), or at least one carrier layer (TS) is optionally applied to the extruded foam during or directly after step TV); and converting the foam molding comprising the following steps a) and b): a) providing a molding comprising a foam and at least one fiber (F), wherein the fiber (F) is with a fiber region (FB2) located inside the molding and surrounded by the foam, b) at least partially dividing the molding at least once, wherein at least one fiber (F) is completely divided to obtain a converted molding, wherein in step a) the molding is provided when at least one fiber (F) is partially introduced into the foam with a result that the fiber (F) is with the fiber region (FB2) located inside the molding and surrounded by the foam while a fiber region (FB1) of the fiber (F) projects from a first side of the molding and a fiber region (FB3) of the fiber (F) projects from a second side of the molding and the fiber region (FB1) and/or the fiber region (FB3) are then optionally removed, wherein partial introduction is optionally effected by steps a1) to a6): a1) optionally applying at least one layer (S2) and optionally applying at least one carrier layer (TS) to at least one side of the foam, a2) producing one hole per fiber (F) in the foam and optionally in the layer (S2) and optionally in the carrier layer (TS), wherein the hole extends from a first side to a second side of the foam and optionally through the layer (S2) and optionally through the carrier layer (TS), a3) providing at least one fiber (F) on the second side of the foam, a4) passing a needle from the first side of the foam through the hole to the second side of the foam and optionally passing the needle through the layer (S2) and optionally passing the needle through the carrier layer (TS), a5) securing at least one fiber (F) to the needle on the second side of the foam and a6) returning the needle along with the fiber (F) through the hole, so that the fiber (F) is with the fiber region (FB2) located inside the molding and surrounded by the foam while the fiber region (FB1) of the fiber (F) projects from a first side of the molding or optionally from the layer (S2) or optionally from the carrier layer (TS) and the fiber region (FB3) of the fiber (F) projects from a second side of the molding, wherein the at least partial dividing of the molding in step b) is effected with a cutting tool; wherein the at least partial dividing of the molding in step b) is effected without material removal-, wherein the fiber region (FB1) and the fiber region (FB3) each independently of one another account for 0.1% to 45% and the fiber region (FB2) accounts for 10% to 99.8% of the total length of a fiber (F) in step a).

18. The method according to claim 1, wherein
the fiber (F) in step a) has been introduced into the foam at an angle a of 0° to 60° relative to the thickness direction (d) of the molding.

\* \* \* \* \*